United States Patent [19]

Inoue et al.

[11] Patent Number: 4,964,293
[45] Date of Patent: Oct. 23, 1990

[54] METHOD OF MANUFACTURING METALLIC GASKETS

[75] Inventors: Kunitoshi Inoue, Higashiosaka; Shigeru Kawaguchi, Daito; Kazuhiro Nomoto, Higashiosaka, all of Japan

[73] Assignee: Nippon Gasket Co., Ltd., Higashiosaka, Japan

[21] Appl. No.: 328,270

[22] Filed: Mar. 24, 1989

[30] Foreign Application Priority Data

Mar. 28, 1988 [JP] Japan ................... 63-71789

[51] Int. Cl.⁵ .............................................. B21K 3/00
[52] U.S. Cl. ................................ 72/379.2; 29/446; 277/213
[58] Field of Search .............. 72/379; 29/173, 446; 277/213

[56] References Cited

U.S. PATENT DOCUMENTS

| 3,304,761 | 2/1967 | Herzog | 72/375 |
| 4,203,608 | 5/1980 | Nicholson et al. | 277/213 |
| 4,331,336 | 5/1982 | Czernik et al. | 29/446 |
| 4,829,799 | 5/1989 | Coe et al. | 72/379 |

FOREIGN PATENT DOCUMENTS 57-19486  4/1982  Japan.
62-93573  4/1987  Japan.

*Primary Examiner*—Lowell A. Larson
*Attorney, Agent, or Firm*—Browdy and Neimark

[57] ABSTRACT

This invention discloses the method of manufacturing metallic gaskets which are properly prestressed by a load which is determined according to a stress calculation. In the process of applying prestresses to the gaskets, a die formed to a thickness smaller than the thickness of the metallic gasket material—which has a bead portion and is coated with resin such as a fluoroelastomer—is placed close to and surrounding the outer circumference of the metallic gasket material or inside the holes formed in the metallic gasket material. Then, the tension side of the bead portion of the metallic gasket material is prestressed by a stress greater than a specified stress that will occur when the metallic gasket is used.

8 Claims, 3 Drawing Sheets

METHOD OF MANUFACTURING METALLIC GASKETS

BACKGROUND OF THE INVENTION

1. Field of the Invention

This invention relates to a method of manufacturing metallic gaskets installeld between a cylinder block and a cylinder head of engines to seal the gap between them.

2. Description of the Prior Art

The conventional gaskets installed between the cylinder block and the cylinder head in the engine are generally formed of a thin metallic resilient plate which has a waved bead portion and is coated at its front and back surfaces with heat-resistant surface treatment material such as fluoroelastomer. The combined action of the resiliency of the bead portion and the adhering property of the fluoroelastomer provides the gaskets with a combustion gas sealing function under high-temperature and high-pressure conditions.

In high-performance engines in recent years, however, the environments in which the gaskets are installed are becoming increasingly stringent as a greater number of engines are employing turbo specifications and double overhead camshafts and as the detonating pressure and demands for smaller and lighter engines increase As a result, the gasket resiliency and sealing function deteriorate over the long period of use.

A conventional metal gasket is disclosed in the Japanese Utility Model Publication No. 19486/1982, in which a base metal is coated at its surface with a soft film. The sealing ability of this gasket is improved by the soft film and by properly selecting the bead angle and bead width at bolt positions.

A method of manufacturing the metallic gaskets that improves the sealing ability by reducing variations in bead height is disclosed by the Japanese Patent Laid-Open No. 93573/1987. In this method, when manufacturing a metallic gasket with raised strips formed around holes in the thin metal plate, the thin metal plate is pressed to form the raised strips which are higher than a specified height. The pressed thin metal plate is then compressed between opposing dies to set the rated strip heights to a desired value. This method aims at producing an effect that the raised strips that are formed higher than the specified height and then compressed to a desired height will have greater resilience than those which are formed to that height in one process.

The above metallic gasket utilizes the uniform heights of the bead portions to provide a required surface pressure for sealing. The above method, however, does not employ a proper setting on the gasket in securing the necessary surface pressure of the bead portion, so that there are variations in the gasket dimensions and strength. Therefore, the gaskets thus formed are not reliable in terms of sealing ability, service life and durability.

SUMMARY OF THE INVENTION

The object of this invention is to provide a method of manufacturing metallic gaskets, which overcomes the above problems and allows mass-production of gaskets; and in which the metallic gasket material is properly prestressed by a load which is determined by stress calculation, to produce residual stresses in specified parts of the bead portion of the formed metallic gasket and thereby give a desired spring function to the bead portion, thus preventing troubles due to deteriorated resilience or metal fatigue, improving sealing performance, reducing dimensional or characteristic variations in the formed gaskets, increasing the life, durability and reliability of the gaskets.

Another object of the invention is to provide a method of manufacturing metallic gaskets, in which a die formed to a thickness smaller than the thickness of the metallic gasket material which has a waved bead portion and is coated with resin such as fluoroelastomer, is placed close to the metallic gasket material; and in which the tension side of the bead portion of the metallic gasket material is preloaded with a stress greater than a specified stress that will occur in the gasket when the gasket is used, thereby uniformly producing desired residual stresses in the tensed portion, i.e., a part of the bead portion which will be tensed when the gasket is compressed during use.

A further object of the invention is to provide a method of manufacturing metallic gaskets, in which a die is formed as a die frame and placed to surround the entire circumference of the metallic gasket so as to prevent the metallic gasket from being applied with an uneven prestressing load and ensure the prestressing is performed in good conditions, thereby improving uniformity and reliability of the metallic gaskets.

A further object of the invention is to provide a method of manufacturing metallic gaskets, in which the die is formed into a shape such that it can be placed inside holes in the metallic gasket material, for example, a circular shape slightly smaller than the corresponding cylinder bore when the metallic gasket is to be installed between the cylinder head and the cylinder gasket; and in which the die is placed close to the bead portion around the hole in the metallic gasket material to press the gasket material in a very good condition, thus making metallic gaskets with high accuracy.

Another object of the invention is to provide a method of manufacturing metallic gaskets, in which a metallic gasket material is coated with resin such as fluoroelastomer and formed with bead portions at positions surrounding holes such as cylinder bores, and a die of a specified shape is placed close to the metallic gasket; in which the metallic gasket material and the die in the above positional relationship are placed on the mount of a press to prestress the bead portion of the metallic gasket material; in which when the bead portion is loaded and the tension side of the bead portion is stressed, the die is not deformed in thickness by a pressing force of the hydraulic press since it is formed of very hard material; in which the thickness of the die is set in such a way that when the bead portion is prestressed, it will not be totally flattened but be applied with a stress exceeding an elastic range, higher than the stress that will occur in the gasket when the gasket is used, so that when the prestressing is completed, all the bead portions will invariably have a desired residual stress on the tension side, allowing mass-production of uniform metallic gaskets; and in which the metallic gasket material is hot-pressed in a condition close to that of actual use so as to obtain desired metallic gaskets.

A still further object of the invention is to provide a method of manufacturing metallic gaskets, in which the shape of the bead portion of the metallic gasket material and the thickness of the die are predetermined according to the stress analysis considering the characteristic of the metallic gasket material, the shape and height of the bead portion and the thickness of the die and according to the measured load-flexure curve, so that the metallic gaskets with a desired residual stress in the bead portion can be mass-produced reliably and cheaply and that the metallic gaskets thus manufactured, when installed between the cylinder head and the cylinder block of an engine under a preset residual stress, will have increased resilience and reduced variations in durability, thus improving reliability in management and supply of the metallic gaskets.

DETAILED DESCRIPTION OF THE EMBODIMENT

One embodiment of this invention for manufacturing matallic gaskets will be described by referring to the accompanying drawings.

Figure 1:
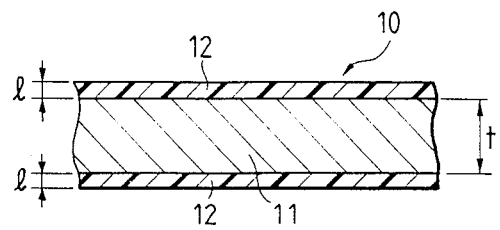
FIG. 1 is a cross-sectional view showing a part of the metallic gasket material which will be formed into a metallic gasket according to the method of this invention.
Figure 2:
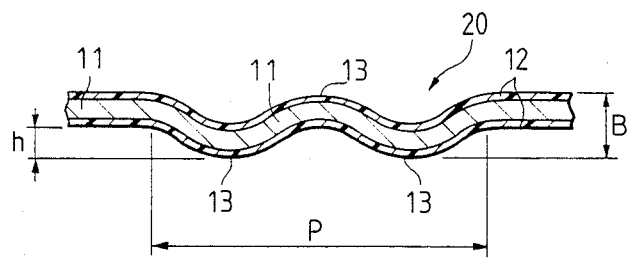
FIG. 2 is a cross-sectional view showing a part of the metallic gasket material which is formed with a bead portion by waving the metallic gasket material of FIG. 1.
Figure 3A:
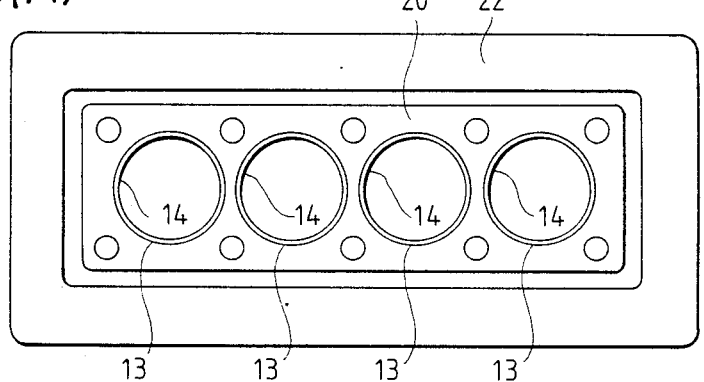
FIG. 3(A) and 3(B) are explanatory views showing an example of a prestressing process to produce residual stresses in the bead portion of the metallic gasket by using a die frame.

FIG. 1 shows a part of the structure, prior to forming, of a metallic gasket material 10 which will be applied to the gasket manufacturing method of this invention. The metallic gasket material 10 consists of a base plate 11 of stainless steel (SUS301) with the thickness of 0.25 mm and hardness of about HV450 and with a fluoroelastomer 12 about 25 u thick formed on both surfaces of the base plate 11. The fluoroelastomer 12 is bonded or coated on the base plate 11. The metallic gasket material 10 with such a construction is formed by a press to produce a waved bead portion 13, as shown in FIG. 2. When the metallic gasket is to be used for a seal between the cylinder head and the cylinder block, the bead portion 13 is formed around the cylinder bores, as shown in FIG. 3(A). In this case, the metallic gasket is formed with holes 14 that correspond to the cylinder bores. If the thickness t of the base plate is 0.25 mm and that of the resin l is about 25 u, the gasket is pressed so that the height h and the pitch p of the bead portion 13 will be 0.25 mm and 3.5 mm, respectively. It is possible to coat the fluoroelastomer 12 over the base plate 11 of such a metal as stainless steel after it is formed with waves by press. The metallic gasket material 10 thus formed is then prestressed to produce residual stresses. Residual stresses are produced as follows.

Figure 3B:
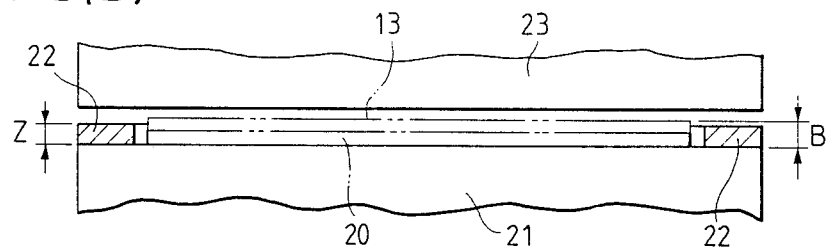

First, as shown in FIGS. 3(A) and 3(B), the metallic gasket material 20 formed with beads is placed on a mount 21 such as hydraulic press bolster or die, and a die frame 22 with a specified thickness of Z is positioned so as to surround the metallic gasket material 20. The die frame 22, which is a forming die, is made of a very hard material so that its thickness will not be deformed by the pressing force of the hydraulic press used for the gasket forming. The thickness Z of the die frame 22 is preset to a value smaller than a height B ($B = h + t + 2l$) of the fluoroelastomer-coated metallic gasket material 20 with the bead portion 13. In other words, the thickness Z of the die frame 22 is so set that the bead portion 13 of the metallic gasket material 20 will not completely be flattened and that the metallic gasket material 20 will have stresses in excess of the elastic range, higher than the specified stress that will occur in the gasket when it is tightened and subjected to effects of piston's reciprocating motion and heat during engine operation. The thickness Z of the die frame 22 is also set so that the stresses produced in the gasket during operation will not exceed the optimum residual stress. Therefore, the tension side of the bead portion 13 of the metallic gasket material 20, or a part of the gasket which will be tensed when it is compressed during operation, is given a stress higher than a specified stress that will occur during use. For example, the residual stress in the metallic gasket is around 15 kgf/mm² depending on the location, which demonstrates the gasket has high durability. It is of course possible to press the metallic gasket material 20 by preheating it to a temperature close to that experienced during actual use. In other words, the metallic gasket material 20 is hot-pressed to apply appropriate residual stresses that matches the real conditions of use.

How residual stresses are produced in the metallic gasket is explained in the following by referring to FIG. 4.

Figure 4:
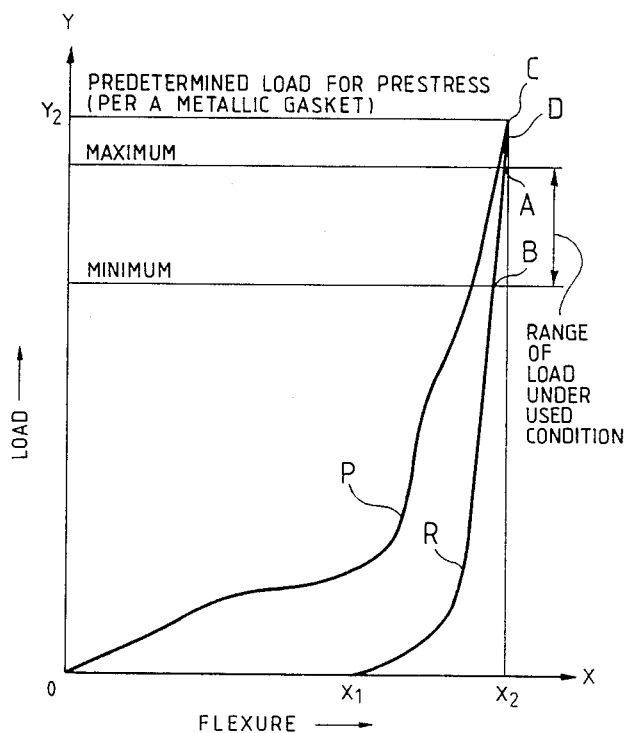
FIG. 4 is a diagram showing the load-flexure characteristic when the metallic gasket with residual stresses is formed and when it is mounted and fastened during service.
Figure 5:
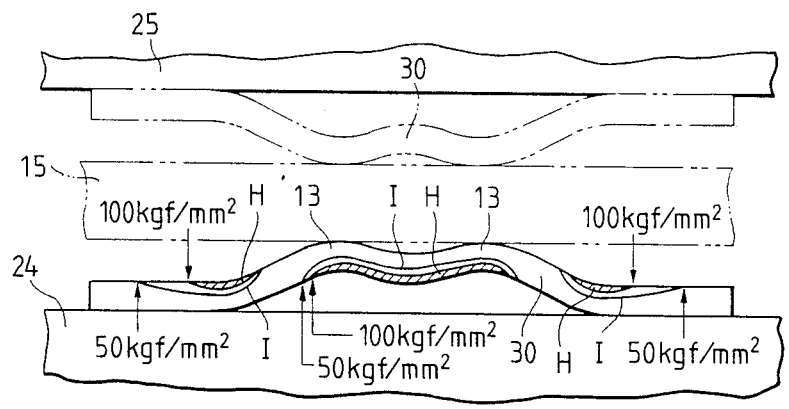
FIG. 5 is a diagram showing the stress distribution in the bead portion when the gasket is set in a condition close to that of actual use.

In FIG. 3(B), as the ram 23 of the hydraulic press is lowered to apply a load to the bead portion 13 of the metallic gasket material 20, the metallic gasket material 20 exhibits a load-flexure characteristic as shown in FIG. 4. In FIG. 4, the vertical axis (Y axis) represents a load and the horizontal axis (X axis) represents a flexure. A point X2 on the X axis shows the flexure when the gasket is applied with a predetermined load for prestress. That is, at this point the underside of the ram 23 that was lowered is in contact with the upper surface of the die frame 22 so that it will no longer be lowered. Thus, the downward pressure or compressing pressure of the ram 23 will no longer be applied to the bead portion 13 of the metallic gasket material 20. This point, therefore, is the limit for prestressing of the bead portion 13. The pressure applied on the metallic gasket material 20 by the hydraulic press is as follows. When the hydraulic press is energized, the pressure follows a curve P from 0 to C (point C corresponds to the flexure X2). Then, as the press is deenergized, the pressure follows a curve R from C to X1. The thickness Z of the die frame 22 is set to generate stresses 10% to 15% higher than the maximum stress produced when the metallic gasket is installed and tightened. At point X1 where the load is removed, a residual stress of about 15 kgf/mm² remains on the tension side of the metallic gasket. The gasket with such a prestress has higher durability than that of the metallic gaskets with no prestress. A metallic gasket 30, which is formed from the metallic gasket material 20 by using the die frame 22 with the above setting, is installed between the engine cylinder head 25 and the cylinder block 24, as shown in FIG. 5. The stress in the bead portion 13 of the metallic gasket 30 will be set to a level A (FIG. 4). When the metallic gasket 30 is put into actual use, it is subjected to effects of engine heat, detonating force and bolt tightening force, and the load-flexure characteristic changes from A to B. When the gasket 30 is applied with a large load, the characteristic follows the locus from D to B. Therefore, the operating load to which the metallic gasket 30 will be subjected during engine operation will not exceed the prestressing load Y2 at point C so that the gasket will maintain its resilience.

The metallic gaskets 30 (two prestressed gaskets) and the conventional gaskets (two gaskets not prestressed) were installed in actual engine for comparison. The result of the test is shown in the table below. In the test, the water temperature is forcibly increased or reduced between normal temperature and close to 100° C. to expand or contract the cylinder head. In this condition, the bead portions 13 of the metallic gaskets 30 were checked. As is seen from the table, the metallic gaskets that were manufactured by the method of this invention have excellent durability, strength and reliability as compared with those of the conventional metallic gaskets.

| <Test result using actual engines> | | |
|---|---|---|
| | Sample | |
| Time | 2 specimens not prestressed | 2 specimens prestressed |
| 50 hours | No problem was found on two specimens | No problem was found on two specimens |
| 100 hours | Small cracks were found on two specimens | No problem was found on two specimens |
| 150 to 200 hours | Test was halted on two specimens | No problem was found on two specimens |

In FIG. 5, the metallic gaskets 30 are placed on both sides of an adjust plate 15, and a metallic gasket assembly made up of the metallic gasket 30 and the adjust plate 15 is installed between the cylinder block 24 and the cylinder head 25. The stresses that occur during service condition in the bead portion 13 of the metallic gasket 30 located under the adjust plate 15 are distributed as shown by the shaded lines H and solid lines I. These portions indicated by shaded lines H and solid lines I are the tension sides of the metallic gasket 30, i.e., portions that will be tensed when the metallic gasket 30 is put in a working condition. The stresses on the tensed side are, say, 100 kgf/mm$^2$ in the shaded area H and 50 kgf/mm$^2$ in the solid line area I.

Figure 6A:
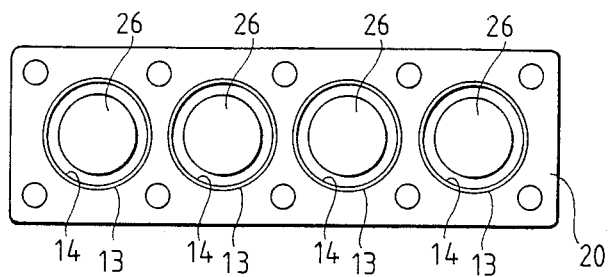
FIG. 6(A) and 6(B) are explanatory views showing another example of the prestressing process to produce residual stresses in the bead portion of the metallic gasket material by arranging dies in the metallic gasket material.
Figure 6B:
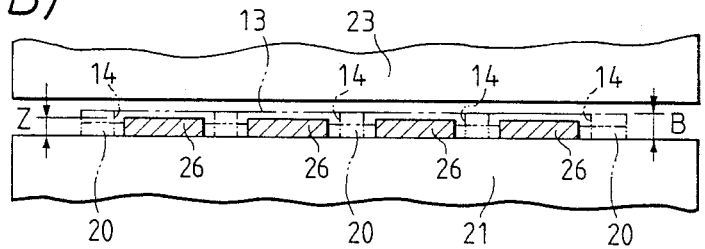

In the foregoing we have described the method of manufacturing the metallic gasket according to this invention, which uses a die frame 22 as a die surrounding the metallic gasket material 20 during the process of prestressing the gasket material The die need not surround the entire circumference of the metallic gasket material 20. For example, as shown in FIG. 6(A) and 6(B), when the metallic gasket 30 which is installed between the cylinder head 25 and the cylinder block 24 has holes 14 corresponding to the cylinder bores, the dies 26 formed as a disk slightly smaller than the holes are placed in each hole 14 to prestress the metallic gasket material 20. The dies 26 are shaped in accordance with the holes of the metallic gasket material 20 and may be formed in a variety of shapes such as circular and square.

Figure 7A:
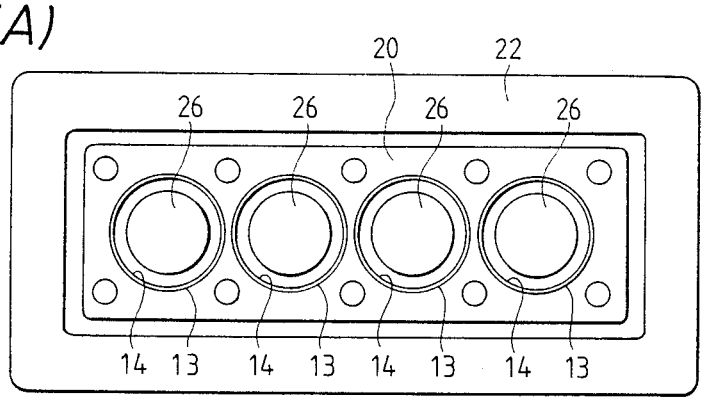
FIG. 7(A) and 7(B) are explanatory views showing still another example of the prestressing process to produce residual stresses in the bead portion of the metallic gasket material by arranging dies in the metallic gasket material and the die frame around the gasket material.
Figure 7B:
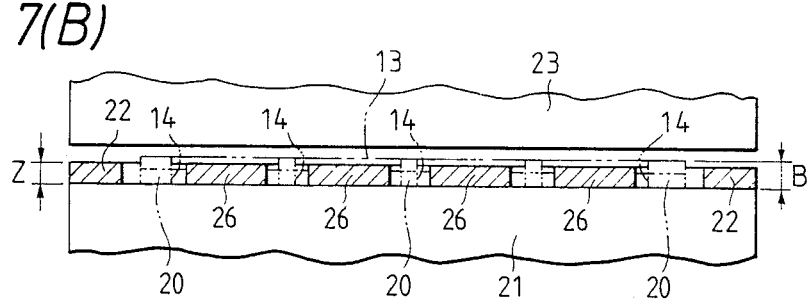

As shown in FIG. 7(A) and 7(B), both the die frame 22 arranged close to the outer circumference of the metallic gasket material 20 and the dies 26 placed inside the holes 14 of the metallic gasket material may be used for prestressing the metallic gasket material 20. In this case, the metallic gasket meterial 20 can be formed with very high accuracy.

We claim:

1. A method of manufacturing metallic gaskets, comprising:
   placing a metallic gasket material and a hard forming body close to the metallic gasket material on a flat surface of a mount, said metallic gasket material having a waved bead portion and being coated with a resin to a specified thickness, wherein said hard forming body has a thickness smaller than a thickness of the metallic gasket material; and
   prestressing the metallic gasket material by a press means to a mount to render a stress in a tension side of the bead portion of the metallic gasket material that is greater than stress that will occur in the metallic gasket under use, when assembled.

2. A method of manufacturing metallic gaskets as set forth in claim 1, wherein the resin covering the metallic gasket material is a fluoroelastomer.

3. A method of manufacturing metallic gaskets as set forth in claim 1, wherein the die is a die frame surrounding the outer circumference of the metallic gasket material.

4. A method of manufacturing metallic gaskets as set forth in claim 1, wherein the die is so shaped as to be able to be placed inside holes in the metallic gasket material.

5. A method of manufacturing metallic gaskets as set forth in claim 1, wherein the press means is a hydraulic press.

6. A method of manufacturing metallic gaskets as set forth in claim 1, wherein the press forming used is a hot press forming.

7. A method of manufacturing metallic gaskets as set forth in claim 1, wherein the tension side of the bead portion of the metallic gasket material is a part of the gasket which is tensed when the metallic gasket is compressed in the service condition.

8. A method of manufacturing metallic gaskets as set forth in claim 1, wherein before the tension side of the bead portion of the metallic gasket material is pressed for forming, said thickness of the hard forming body is preset to a height to generate stresses higher than the maximum stresses produced on the metallic gasket waved bead portion after pre-determining load-flexures of said gasket by applying a predetermined load for prestress so that the stress produced in the metallic gasket will be greater than that which will occur after the metallic gasket is assembled to a driven engine.

* * * * *